US005278245A

United States Patent [19]
DuBois et al.

[11] Patent Number: 5,278,245
[45] Date of Patent: * Jan. 11, 1994

[54] THERMOPLASTIC ELASTOMERS

[75] Inventors: Donn A. DuBois; Carl L. Willis, both of Houston, Tex.

[73] Assignee: Shell Oil Company, Houston, Tex.

[*] Notice: The portion of the term of this patent subsequent to Mar. 16, 2010 has been disclaimed.

[21] Appl. No.: 957,494

[22] Filed: Oct. 7, 1992

Related U.S. Application Data

[62] Division of Ser. No. 525,812, May 21, 1990, Pat. No. 5,194,510.

[51] Int. Cl.$^5$ ............................................ C08F 297/02
[52] U.S. Cl. ..................................... 525/299; 525/271; 525/250
[58] Field of Search ......................... 525/250, 271, 299

[56] References Cited

U.S. PATENT DOCUMENTS

| | | |
|---|---|---|
| 3,431,323 | 3/1969 | Jones . |
| 3,567,798 | 2/1971 | Haefele et al. . |
| 3,607,977 | 9/1971 | Taylor et al. ........................ 525/299 |
| 3,792,005 | 2/1974 | Harian . |
| 3,842,145 | 10/1974 | Hsieh . |
| 3,948,846 | 4/1976 | Waters ................................. 525/299 |
| 4,001,350 | 1/1977 | Fahrbach et al. . |
| 4,347,340 | 8/1982 | Giusti .................................. 525/299 |
| 4,388,448 | 6/1983 | Melby . |
| 4,461,874 | 7/1984 | Teyssie et al. . |
| 4,628,072 | 12/1986 | Shiraki et al. ......................... 525/57 |
| 4,638,072 | 12/1986 | Shiraki et al. . |
| 4,665,131 | 5/1987 | Moriya et al. . |
| 4,704,433 | 11/1987 | Ueki et al. ............................ 525/299 |

FOREIGN PATENT DOCUMENTS

| | | |
|---|---|---|
| 772158 | 9/1970 | Belgium . |
| 0973295 | 8/1975 | Canada ................................. 525/299 |
| 973295 | 8/1975 | Canada . |
| 0298667 | 1/1989 | European Pat. Off. . |
| 1934593 | 1/1970 | Fed. Rep. of Germany ...... 525/299 |
| 9016663.9 | 4/1991 | Fed. Rep. of Germany . |
| 520327 | 11/1974 | U.S.S.R. . |
| 1332165 | 10/1973 | United Kingdom . |

OTHER PUBLICATIONS

T. Long et al., Anionic Synthesis and Characterization of Various Poly(Alky Methacrylates), *Polymer Preparation*, 27(2), 258 (1986).

T. Long et al., Synthesis and Characterization of Ion-Containing Block Copolymers by Anionic Techniques, *Polymer Preprints*, 28(1), 384 (1987).

Allen et al., Synthesis of Tactic Poly(Alky Methacrylate) Homo and Copolymers, Advances in Polymer Synthesis, ACS Symposium Series No. 302, 347 (1985).

Allen et al., Studies on the Synthesis of Novel Block Ionomers, ACS Symposium Series, 302, 79 (1986).

Anderson, "Speed" Marvel at DuPont, J. Macromol., Sci.-Chem., A21, 1665-1687, (1984).

Encyclopedia of Polymer Science and Technology, vol. 7, pp. 562-567, (1967).

John Wiley & Sons, Principles of Polymerization 3rd Ed. (1991).

*Primary Examiner*—Vasu S. Jagannathan

[57] ABSTRACT

Block copolymers of particular structure comprising blocks of polymerized alkenyl aromatic compound and polymerized conjugated alkadiene, as well as selectively hydrogenated derivatives thereof, are functionalized by the presence of additional polar blocks of polymerized alkyl methacrylate.

18 Claims, No Drawings

THERMOPLASTIC ELASTOMERS

This is a division of application Ser. No. 07/525,812, filed May 21, 1990, now U.S. Pat. No. 5,194,510.

FIELD OF THE INVENTION

This invention relates to certain novel, optionally selectively hydrogenated, block copolymers having a polar block and non-polar blocks. More particularly, the invention relates to thermoplastic elastomers comprising optionally selectively hydrogenated block polymers of at least one block of polymerized alkenyl aromatic compound, a block of polymerized conjugated alkadiene and at least one block of polymerized alkyl methacrylate.

BACKGROUND OF THE INVENTION

Elastomeric polymers, both homopolymers and polymers of more than one monomer, are well known in the art and include natural rubbers as well as a wide variety of synthetic materials. A particularly useful class of synthetic elastomers is the class of thermoplastic elastomers which demonstrates elastomeric properties at ambient temperatures but which is processable at somewhat elevated temperatures by methods more conventionally employed for non-elastomeric thermoplastics. Such thermoplastic elastomers are illustrated by a number of types of block polymers including, for example, block polymers of alkenyl aromatic compounds and conjugated alkadiene. Block polymers of styrene and butadiene are illustrative. This particular type of block polymer is well known in the art and a number are commercial, being marketed by Shell Chemical Company as KRATON ® Thermoplastic Rubber.

The properties of block polymers, even containing the same or similar monomers, will vary considerably with the arrangement of the monomeric blocks within the block polymer and with the relative molecular weight of each block. To obtain good elastomeric properties a so-called "hard" phase, e.g., a polymerized alkenyl aromatic compound portion, of the molecule must be at least a terminal or outer portion of the polymeric molecule with the "rubber" phase, e.g., a polymerized alkadiene portion of the molecule being internal. If a block polymer contains the rubber phase as the outer portion of the molecule and the hard phase as an internal portion, the polymer will not demonstrate the desired elastomeric properties and will be somewhat waxy in character with little tensile strength.

It is also known that certain of the properties such as resistance to oxidation of this class of block polymers are improved by the selective hydrogenation of same or all of the carbon-carbon unsaturation in the polyalkadiene or aliphatic portion of the molecule and, on occasion, by the hydrogenation of substantially all the carbon-carbon unsaturation including that unsaturation in the poly(alkenyl aromatic compound) or aromatic portion of the molecule. A number of the selectively hydrogenated block polymers are also well known and commercial, being marketed by Shell Chemical Company as KRATON G ® Thermoplastic Rubber.

An alternate method of modifying selected properties of the block polymers is to provide polarity or functionality within the block polymer as by introducing functional groups as substituents within the molecule or by providing one or more additional blocks within the polymeric structure which are polar in character.

An example of the former method of introducing carboxylic acid functionality is the introduction of functional substituents onto the aromatic rings of a block copolymer in which the carbon-carbon unsaturation of the aliphatic portion has been selectively hydrogenated. This type of functionalization is accomplished by the successive steps of metallation, carboxylation and acidification. This overall carboxylation process is considered conventional. Illustrative of the latter method comprising the introduction of blocks containing functional groups are the polymers of McGrath et al, published European Patent Application 298,667, which includes at least one block of polymerized alkyl methacrylate. The three block polymers of McGrath et al, as produced, are polyalkadiene-polystyrene-poly(alkyl methacrylate) materials and thus are not true thermoplastic elastomers by virtue of the hard or polystyrene phase being an internal portion of the molecule and the rubber or polyalkadiene phase being terminal. It would be of advantage to provide block polymers, functionalized by the presence of additional blocks containing functional groups, which exhibit properties of thermoplastic elastomers.

SUMMARY OF THE INVENTION

The present invention provides novel functionalized block polymers, functionalized by the presence of a block of polymerized functional group-containing monomer. More particularly, the invention provides novel thermoplastic elastomeric block polymers of at least one block of at least predominantly polymerized alkenyl aromatic compound, one internal block of at least predominantly polymerized conjugated alkadiene and at least one terminal block of polymerized alkyl methacrylate, which block polymers are optionally selectively hydrogenated in the polyalkadiene or aliphatic segment.

DESCRIPTION OF THE INVENTION

The novel thermoplastic elastomers of the invention are base block polymers, or selectively hydrogenated derivatives thereof, having (1) at least one block of at least predominantly polymerized poly(alkenyl aromatic compound), one of which blocks is a terminal block, (2) an internal block of at least predominantly polymerized conjugated alkadiene and (3) at least one terminal block of polymerized alkyl methacrylate. In the modification of the block polymers of the invention which are selectively hydrogenated, the hydrogenation is of the polyalkadiene or aliphatic block with little or no hydrogenation of the poly(alkenyl aromatic compound) block or the polymethacrylate block.

The non-hydrogenated or base block polymers of the invention are represented by the formula

 (I)

wherein A independently is polymerized alkenyl aromatic compound. For convenience, the A portion of the block polymer molecule is referred to as the aromatic portion. B is a block of polymerized conjugated alkadiene, also referred to as the aliphatic block. C is polymerized alkyl methacrylate, also referred to as the methacrylate portion, polymerized through the ethylenic unsaturation of the methacrylate moiety. The terms x and y independently are integers from 0 to 1 which signify whether the polymer is a triblock polymer, a tetrablock polymer or a pentablock polymer. When y is 1, x must also be 1, however.

The alkenyl aromatic compound employed as the precursor of the A portion of the polymers of formula I is a hydrocarbon compound of up to 18 carbon atoms having an alkenyl group of up to 6 carbon atoms attached to a ring carbon atom of an aromatic ring system of up to 2 aromatic rings. Such alkenyl aromatic compounds are illustrated by styrene (vinylbenzene), 2-butenylnaphthalene, 3-isopropenylbiphenyl and iso-propenylnaphtalene. The preferred alkenyl aromatic compounds have an alkenyl group of up to 3 carbon atoms attached to a benzene ring as exemplified by styrene and styrene homologs such as those of the formula

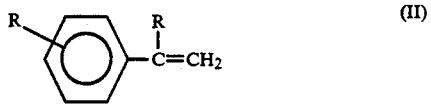

wherein R independently is hydrogen or alkyl of up to 4 carbon atoms, particularly methyl. These alkenyl benzenes include styrene, α-methylstyrene, p-methylstyrene and α,4-dimethylstyrene. Styrene and α-methylstyrene are particularly preferred alkenyl aromatic compounds, especially styrene.

Each A block of the block polymers is at least predominantly the polymerized alkenyl aromatic compound and is preferably homopolymeric. An A block containing a polymerized mixture of more than one alkenyl aromatic compound is also suitable but is less preferred. Also useful are A blocks wherein the alkenyl aromatic compound is copolymerized with a lesser proportion of the conjugated alkadiene of the B block portion. One type of this latter block is conventionally termed "tapered" and such blocks will contain at least about 80% by mole of the alkenyl aromatic compound with any remainder being the conjugated alkadiene. The average molecular weight of an A block will be from about 5,000 to 50,000, preferably from about 5,000 to about 20,000.

The B block of the block polymer of formula I is a block of at least predominantly polymerized conjugated alkadiene. The alkadienes useful as the precursors of the B block have up to 8 carbon atoms such as those conjugated alkadienes of the formula

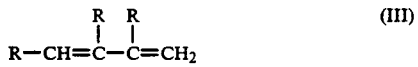

wherein R has the previously stated meaning. Illustrative of such conjugated alkadienes are 1,3-butadiene (butadiene), 2-methyl-1,3-butadiene (isoprene), 1,3-pentadiene (piperylene), 1,3-octadiene and 2-methyl-1,3-pentadiene. Preferred conjugated alkadienes are butadiene and isoprene, particularly butadiene. A B block which contains more than one conjugated alkadiene or a tapered block with the monomer of an A block is also useful. Satisfactory B blocks contain at least 90% of conjugated alkadiene with any remainder being the alkenyl aromatic compound of block A. B blocks which are homopolymeric are preferred. The average molecular weight of the B block is from about 20,000 to about 500,000 but preferably from about 30,000 to about 200,000.

Within a polymerized conjugated alkadiene block, either or both of two modes of polymerization may have taken place, i.e., 1,4-polymerization and 1,2 polymerization. The nature of and the control of these modes is well understood in the art and depend, inter alia, on the reaction conditions and reaction diluent. Within the polyalkadiene block of the polymers of formula I, the percentage of units produced by 1,4 polymerization is at least about 5% and preferably at least about 20%.

The alkyl methacrylate employed as the precursor of the C portion of the polymers of formula I is an alkyl methacrylate wherein the alkyl group has up to 14 carbon atoms inclusive. Illustrative of such methacrylate esters are methyl methacrylate, ethyl methacrylate, sec-butyl methacrylate, t-butyl methacrylate, i-amyl methacrylate, hexyl methacrylate, decyl methacrylate and dodecyl methacrylate. Largely because of ease of polymerization, the preferred alkyl methacrylates are branched-butyl methacrylates, i.e., iso-butyl methacrylate and t-butyl methacrylate. The desired poly(alkyl methacrylate) block is produced by directly polymerizing the corresponding alkyl methacrylate monomer or alternatively the desired block is obtained by polymerizing a more easily polymerizable methacrylate and subsequently transesterifying the product to introduce the desired alkyl group.

The process of producing the block polymers of formula I is, at least in part, rather particular because of the tendency of the methacrylate monomer to form species which terminate polymerization. In the process of producing a more conventional block polymer, i.e., a block polymer of styrene and butadiene, a variety of process schemes are available. Such procedures include the production by anionic polymerization of a so-called "living" polymer of either type of monomer before "crossing over" to the polymerization of the other type of monomer. It is also conventional to produce such block polymers by sequential polymerization or by the use of coupling agents to obtain branched or radial polymers. In the production of the polymers of the invention, the aliphatic and aromatic portions are produced by sequential polymerization and the alkyl methacrylate block is then produced as a final process step.

In a typical procedure to form a polymer of formula I wherein x and y are zero, the alkenyl aromatic compound is anionically polymerized in the presence of a metal alkyl initiator, preferably an alkali metal alkyl. The use of such initiators in block polymerizations is well known and conventional. A particularly preferred initiator is sec-butyllithium. The polymerization takes place in a non-polar hydrocarbon solvent such as cyclohexane or in mixed polar/non-polar solvents, e.g., mixtures of cyclohexane and an ether such as tetrahydrofuran or diethyl ether. Suitable reaction temperatures are from about 20° C. to about 80° C. and the reaction pressure is sufficient to maintain the mixture in the liquid phase. The resulting product is a poly(alkenyl aromatic compound) species with a terminal organometallic site which is used for further polymerization. This species is then used to initiate polymerization of the conjugated alkadiene by introducing the alkadiene into the product mixture of the initial polymerization. Polymerization of the alkadiene results in the production of the B block of the polymers of formula I with the product also retaining an organometallic site for further polymerization. When the reaction solvent is non-polar, the desired degree of 1,4 polymerization takes place whereas the presence of polar material in a mixed solvent results in an increased proportion of 1,2 polymerization. Polymers resulting from about 6% to about 95% of 1,2 polymerization are of particular interest. In the case of 1,4 polymerization, the presence of ethylenic unsaturation in the polymeric chain results in cis and trans configurations. Polymerization to give a cis configuration is predominant. If the polymerization of the alkenyl aromatic compound is substantially complete before the conjugated alkadiene is introduced, substantially homopolymeric A and B blocks will result. If the conjugated alkadiene is introduced before the polymerization of the alkenyl aromatic compound is complete, the resulting blocks will be tapered.

The third polymerization step in the production of the block polymers of formula I wherein y is zero will depend upon the nature of the block polymer desired. In the embodiment wherein the block polymer is a triblock polymer, i.e., x is also zero, the living diblock species resulting from conjugated alkadiene polymerization is used to initiate polymerization of the alkyl methacrylate. When the production of a tetrablock polymer is desired, i.e., x is 1, the diblock species is used to initiate the polymerization of the second A block in the media of the production of the diblock species by substantially the same procedure as that used to polymerize the prior blocks. The resulting living triblock polymeric species retains an organometallic site which is then used to initiate alkyl methacrylate polymerization.

The production of the non-hydrogenated polymer of the invention in which x and y are each 1 is somewhat different procedurally, although the process technology is broadly old. In this modification, the central B block is produced first by polymerizing the conjugated alkadiene in the presence of a difunctional initiator, e.g., 1,3-bis(1-lithio-1,3-dimethylphentyl)benzene, to produce a living polyalkadiene species with two reactive organometallic sites. This polymeric species is then reacted with an alkenyl aromatic compound to produce a triblock polymeric species of two A blocks and a central B portion, also with two reactive organometallic sites. This species is then employed to initiate polymerization of the alkyl methacrylate at each of the two terminal reactive sites.

As stated, a living diblock species or triblock species is used to initiate alkyl methacrylate polymerization. The polymeric species is reacted, typically in situ without need for recovery or purification, with alkyl methacrylate to add a polymethacrylate block at the reactive site of the polymeric species of formula IV. The relative proportion of the alkyl methacrylate to be employed will be determined by the composition of the functionalized block copolymer whose production is desired. Typically, sufficient alkyl methacrylate is added to constitute from about 1% to about 50% of the molecular weight of the block copolymer. Reaction to produce the methacrylate block takes place in the mixed solvent at a temperature from about 10° C. to about 50° C., preferably from about 10° C. to about 30° C. Subsequent to production of the polymethacrylate block, the polymerization is terminated by reaction with a protic material, typically an alkanol such as methanol or ethanol. The polymer is then recovered by well known procedures such as precipitation of solvent removal.

In terms of formula I, the polymers produced by the above procedure are of the type ABC or ABAC depending upon whether a second block of alkenyl aromatic compound was introduced into the polymer. The polymers will have average molecular weight of from about 20,000 to about 1,000,000, preferably from about 40,000 to about 500,000, as determined by gel permeation chromatography.

An alternate and generally conventional method of indicating the composition of polymers such as those of formula I is to indicate the monomer whose polymerization has formed the block. Thus, a triblock polymer of styrene, butadiene and alkyl methacrylate is termed SBMA where S represents a polystyrene block, B represents a butadiene block and MA represents a methacrylate block. A tetrablock polymer of the same components would be termed SBSMA and a triblock polymer having a block of isoprene rather than butadiene would be termed an SIMA. Block polymers of the SBMA type are particularly preferred. A pentablock polymer would be termed MASBSMA.

In a second modification of the functionalized block polymers of the invention, the block polymers of alkenyl aromatic compound, conjugated alkadiene and alkyl methacrylate are selectively hydrogenated to reduce the extent of unsaturation in the aliphatic portion of the block polymer while not substantially reducing the aromatic carbon-carbon unsaturation of the aromatic portion of the block copolymer or hydrogenating or hydrogenolyzing the alkyl methacrylate portion. A number of catalysts, particularly transition metal catalysts, are capable of selectively hydrogenating the aliphatic unsaturation of a hydrocarbon SBS polymer, but the presence of the poly(methacrylate) block makes the selective hydrogenation more difficult. To selectively hydrogenate the aliphatic unsaturation it is preferred to employ a "homogenous" catalyst formed from a soluble nickel compound and a trialkylaluminum. Nickel naphthenate or nickel octoate is a preferred nickel salt. Although this catalyst system is one of the catalysts conventionally employed for selective hydrogenation of an SBS polymer, other "conventional" catalysts for the SBS selective hydrogenation are not suitable for selective hydrogenation of the poly(methacrylate)-containing block polymers of the invention.

In the selective hydrogenation process, the base block polymer is reacted in situ or if isolated is dissolved in a suitable solvent such as cyclohexane or a cyclohexane-ether mixture and the resulting solution is contacted with hydrogen gas in the presence of the homogeneous nickel catalyst. hydrogenation takes place at temperatures from about 25° C. to about 150° C. and hydrogen pressures from about 15 psig to about 1000 psig. Hydrogenation is considered to be complete when at least about 90%, preferably at least 98%, of the carbon-carbon unsaturation of the aliphatic portion of the base block polymer has been saturated, as can be determined by nuclear magnetic resonance spectroscopy. Under the conditions of the selective hydrogenation no more than about 5% and preferably even fewer of the units of the aromatic portion and the polymethacrylate portion will have undergone reaction with the hydrogen. The selectively hydrogenated block polymer is recovered by conventional procedures such as washing with aqueous acid to remove catalyst residues and removal of the solvent and other volatiles by evaporation or distillation. The resulting selectively hydrogenated block polymer is of the general formula

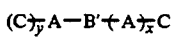
(IV)

wherein A, C, x and y have the previously stated meanings and B' is a block of hydrogenated, polymerized alkadiene, B, wherein at least 90% of the carbon-carbon unsaturation of B has been saturated with hydrogen.

The selectively hydrogenated block copolymer is identified by the structures of the aromatic and methacrylate portions and by the "apparent" structure of the hydrogenated aliphatic portion. For example, an SBMA block polymer, wherein the B block is produced with a high percentage of 1,4 polymerization, is selectively hydrogenated to a SEMA block polymer. The selectively hydrogenated aliphatic portion is termed "E" because of its apparent similarity to polyethylene. A corresponding tetrablock polymer would be termed SESMA. If the aliphatic block of an SBSMA polymer results from 1,2 and 1,4 polymerization, the resulting selectively hydrogenated block polymer is termed SE/BSMA or SEBSMA because of the similarity of the hydrogenated aliphatic portion to an ethylene/butylene copolymer. By way of yet another illustration, the selectively hydrogenated block polymer derived from an SIMA polymer having a high degree of 1,4 polymerization in the polyisoprene block is termed an SE/PMA or SEPMA polymer because of the similarity of the hydrogenated polyisoprene block to an ethylene/propylene copolymer.

The block polymers of the invention, both the base block polymers and the selectively hydrogenated derivatives thereof, are thermoplastic elastomers and have utilities conventional for such block polymers. However, because of the functionality, i.e., polarity, of the block polymers they are useful in applications where the properties imparted by the functionality are important. The polymers are particularly useful in adhesive formulations, coatings formulations, especially those based on water emulsions, and the polymers demonstrate improved high temperature tensile strength. The selectively hydrogenated triblock polymers are particularly useful in lubricating oil formulations to improve the viscosity index of the resulting formulation.

The invention is further illustrated by the following Illustrative Embodiments which should not be construed as limiting.

ILLUSTRATIVE EMBODIMENT I

To a three gallon autoclave maintained under an inert nitrogen gas atmosphere was added 5.88 lbs of cyclohexane, 2.05 lbs of diethyl ether and 0.28 lb of styrene. The resulting solution was titrated with sec-butyllithium until a slight exotherm was noted, after which sufficient sec-butyllithium was added to give a concentration of 317 ppm. The polymerization which resulted took place at 25° C. over a 30 minute period. At the end of this period 1.42 lb of 1,3-butadiene was added and the resulting polymerization was allowed to proceed at 25° C. for approximately 40 minutes. The next addition was 0.28 lb of styrene which polymerized over a 30 minute period at 25° C. The final addition was 0.41 lb of t-butyl methacrylate which polymerized in less than 1 minute at 25° C.

The polymer product solution was analyzed by gel permeation chromatography (GPC) and by nuclear magnetic resonance (NMR). GPC analysis indicated a number average molecular weight of 125,000 with a molecular weight distribution (Mw/Mn) of 1.3. Analysis by $^{13}$C-NMR gave a composition of 16% by mol of polymerized styrene, 76% by mole of polymerized 1,3-butadiene (36% by mol 1,2 polymerization and 40% by mol 1,4 polymerization) and 8% by mol polymerized t-butyl methacrylate, each percentage based on the total polymer.

ILLUSTRATIVE EMBODIMENT II

The solution of functionalized block copolymer of Illustrative Embodiment I was hydrogenated with molecular hydrogen employing a homogeneous nickel catalyst obtained by reducing nickel octoate with triethylaluminum. The ratio of nickel to aluminum was 1:2.3. The temperature of the solution was gradually increased with the total catalyst charge of 105 ppm being added in three portions.

At 35° C. the first 25% of the catalyst was added with the addition of the second 25% at 55° C. and the remainder at 90° C. The conversion of base block polymer as a function of time was determined by NMR spectroscopy and is shown in Table I. The residual aliphatic unsaturation of the final hydrogenated polymer was estimated to be 25 milliequivalents of aliphatic carbon-carbon double bonds per gram of polymer. Expressed differently, 97.4% of the aliphatic carbon-carbon double bonds had been saturated by hydrogenation.

TABLE I

| Conversion, % | Elapsed time, minutes |
|---|---|
| 81.5 | 15 |
| 95.9 | 50 |
| 96.8 | 85 |
| 97.3 | 120 |
| 97.4 | 150 |

ILLUSTRATIVE EMBODIMENT III

A number of block polymers of varying structure were dissolved in tetrahydrofuran and the solutions were used to prepare cast films. The stress at break of these films was determined at two temperatures. The values, which reflect the tensile strength of the polymers, are shown in Table II wherein, in referring to polymer type, S refers to a polystyrene block, B refers to a polybutadiene block, I refers to a polyisoprene block EB refers to an hydrogenated polybutadiene block having at least some 1,2 configuration, EP refers to an hydrogenated isoprene block and t-Bu MA refers to a block of polymerized t-butyl methacrylate.

TABLE II

| | Stress at Break (PSI) | |
|---|---|---|
| Polymer Type | 25° C. | 100° C. |
| S—B-tBuMA | a | a |
| S—EB-tBuMA | a | a |
| S—B—S-tBuMA | 5100 | 45 |
| S—EB—S-tBuMA | 5200 | 180 |
| S—EB—S | 5500 | 40 |
| I—S-tBuMA | 370 | b |
| EP—S-tBuA | 400 | b | a) Sample stretched to limit of testing apparatus but did not break.
b) No measurable tensile strength.

What is claimed is:

1. A block polymer comprising (1) one block of at least 80% by mole polymerized alkenyl aromatic compound, (2) an internal block of at least 90% by mole hydrogenated polymerized conjugated alkadiene, (3) a terminal block of polymerized alkyl methacrylate polymerized through the ethylenic unsaturation thereof, wherein the block copolymer has the formula

A—B—C wherein A is the block of the polymerized alkenyl aromatic compound, B is the internal block of the hydrogenated, polymerized conjugated alkadiene, and C is the terminal block of the polymerized alkyl methacrylate, and wherein the block of the polymerized alkenyl aromatic compound has a number average molecular weight from about 5,000 to about 50,000, the internal block of the hydrogenated, polymerized conjugated diene has a number average molecular weight from about 20,000 to about 500,000, and the alkyl moiety of the alkyl methacrylate comprises up to 14 carbon atoms, inclusive.

2. The block polymer of claim 1 wherein the alkenyl aromatic compound is

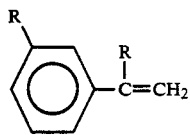

wherein R independently is hydrogen or methyl.

3. The block polymer of claim 2 wherein the conjugated alkadiene is

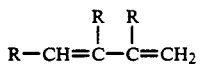

wherein R independently is hydrogen or methyl.

4. The block polymer of claim 3 wherein the alkyl moiety of the alkyl methacrylate is branched butyl.

5. The block polymer of claim 4 wherein the conjugated alkadiene is butadiene or isoprene.

6. The block polymer of claim 5 wherein the alkenyl aromatic compound is styrene.

7. The block polymer of claim 6 wherein the alkyl moiety of the alkyl methacrylate is t-butyl methacrylate.

8. The block polymer of claim 7 wherein the conjugated alkadiene is butadiene.

9. The block polymer of claim 7 wherein the conjugated alkadiene is isoprene.

10. The block polymer of claim 1 wherein at least 90% of the carbon-carbon aliphatic unsaturation has been hydrogenated.

11. The block polymer of claim 10 wherein the alkenyl aromatic compound is

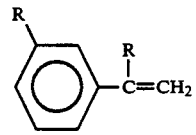

wherein R independently is hydrogen or methyl.

12. The block polymer of claim 11 wherein the alkadiene is

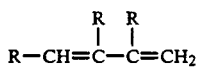

wherein R independently is hydrogen or methyl.

13. The block polymer of claim 12 wherein the alkyl moiety of the alkyl methacrylate is branched butyl.

14. The block polymer of claim 13 wherein the conjugated alkadiene is butadiene or isoprene.

15. The block polymer of claim 14 wherein the alkenyl aromatic compound is styrene.

16. The block polymer of claim 15 wherein the alkyl moiety of the alkyl methacrylate is t-butyl.

17. The block polymer of claim 16 wherein the conjugated alkadiene is butadiene.

18. The block polymer of claim 16 wherein the conjugated alkadiene is isoprene.

* * * * *